United States Patent
Mori et al.

(10) Patent No.: US 7,939,600 B2
(45) Date of Patent: May 10, 2011

(54) BINDER FOR ELECTRIC DOUBLE LAYER CAPACITOR ELECTRODE

(75) Inventors: Hidekazu Mori, Tokyo (JP); Masahiro Yamakawa, Tokyo (JP); Mayumi Fukumine, Tokyo (JP); Keita Tokura, Tokyo (JP)

(73) Assignee: Zeon Corporation, Tokyo (JP)

( * ) Notice: Subject to any disclaimer, the term of this patent is extended or adjusted under 35 U.S.C. 154(b) by 946 days.

(21) Appl. No.: 10/576,676

(22) PCT Filed: Oct. 21, 2004

(86) PCT No.: PCT/JP2004/015600
§ 371 (c)(1),
(2), (4) Date: May 22, 2007

(87) PCT Pub. No.: WO2005/041225
PCT Pub. Date: May 6, 2005

(65) Prior Publication Data
US 2007/0274023 A1    Nov. 29, 2007

(30) Foreign Application Priority Data
Oct. 24, 2003   (JP) .................................. 2003-365277

(51) Int. Cl.
*C08F 220/12*    (2006.01)
*C08F 134/02*    (2006.01)

(52) U.S. Cl. ........ 524/804; 524/811; 524/813; 524/832; 526/266; 526/287; 526/304; 526/307.7; 526/319; 526/328.5; 526/329.6

(58) Field of Classification Search ............... 526/266, 526/287, 304, 307.7, 319, 328.5, 329.6; 524/804, 524/811, 813, 832
See application file for complete search history.

(56) References Cited

U.S. PATENT DOCUMENTS

| | | | | |
|---|---|---|---|---|
| 4,473,678 A | * | 9/1984 | Fink et al. ...................... | 524/211 |
| 6,656,633 B2 | * | 12/2003 | Yamakawa et al. ............ | 429/217 |
| 6,734,246 B2 | * | 5/2004 | Weitzel et al. ................. | 524/459 |
| 6,759,490 B1 | * | 7/2004 | Gerst et al. ...................... | 526/86 |
| 6,884,837 B2 | * | 4/2005 | Kohlhammer et al. ........ | 524/501 |
| 2002/0034686 A1 | | 3/2002 | Yamakawa et al. | |
| 2004/0062989 A1 | * | 4/2004 | Ueno et al. ..................... | 429/217 |

FOREIGN PATENT DOCUMENTS

| | | |
|---|---|---|
| JP | 08-055761 A | 2/1996 |
| JP | 8-157677 A | 6/1996 |
| JP | 10-021964 A | 1/1998 |
| JP | 11-162794 A | 6/1999 |
| JP | 2002-110169 A | 4/2002 |
| JP | 2002-522872 A | 7/2002 |
| JP | 2002-329497 A | 11/2002 |
| JP | 2003-100298 A | 4/2003 |
| JP | 2003-151554 A | 5/2003 |
| JP | 2003-331848 A | 11/2003 |

OTHER PUBLICATIONS

Japanese Office Action issued in corresponding application No. 2005-514970 on Dec. 1, 2009.

* cited by examiner

*Primary Examiner* — Bernard Lipman
(74) *Attorney, Agent, or Firm* — Birch, Stewart, Kolasch & Birch, LLP

(57) ABSTRACT

Provided are a binder for an electric double layer capacitor electrode which gives an electrode having a high electrode density and a high binding force and which comprises a polymer that can give a polymer film having a tensile stress of 2 MPa or less when the film is elongated at the ratio of 100% and having the elongation at break of 450% or more; a binder composition for an electric double layer capacitor electrode and a slurry composition for an electric double layer capacitor electrode which each comprises the binder; an electrode produced by use of the slurry composition; and an electric double layer capacitor which has the electrode so as to exhibit a large electrostatic capacity and a small internal resistance.

8 Claims, No Drawings

BINDER FOR ELECTRIC DOUBLE LAYER CAPACITOR ELECTRODE

TECHNICAL FIELD

The present invention relates to a binder for an electric double layer capacitor electrode; a binder composition for an electric double layer capacitor electrode and a slurry composition for an electric double layer capacitor electrode each of which comprise the binder; an electrode produced by use of the slurry composition; and an electric double layer capacitor having the electrode.

BACKGROUND ART

In recent years, demands for electric double layer capacitors, in which an electric double layer formed in an interface between a polarizing electrode and an electrolyte is utilized, as backup power sources have been rapidly increasing. Attention has been paid also to the application thereof to articles for which a large capacity is required, such as a power source for an electric vehicle, and a high electrode density has been desired for making the capacity thereof larger.

An electrode for an electric double layer capacitor is usually produced by dissolving or dispersing a binder into water or an organic solvent, mixing this with an active material for an electrode and optional materials, such as an electroconductivity additive, to prepare a slurry composition for an electric double layer capacitor electrode, applying this to a current collector made of aluminum foil or the like, and then drying the applied composition. Conventionally, as the binder, there has been generally used a fluorocarbon polymer such as polytetrafluoroethylene, or polyvinylidene fluoride. However, in the electrode produced by use of the fluorocarbon polymer, the binding force between its active material for an electrode and its current collector is insufficient. Additionally, the electrode density thereof is low.

Suggested is a binder using, a polymer which has a specific glass transition temperature and a specific particle diameter as a binder which exhibits a good binding force even if a small amount thereof (see Patent Document 1). However, despite the use of this binder, the binding force between the active material for an electrode and the current collector is insufficient, further, the electrode density is also low.

Patent Document 1: Japanese Patent Application Laid-Open (JP-A) No. 11-162794

DISCLOSURE OF THE INVENTION

Problems to be Solved by the Invention

When an electrode layer is formed, it is usually pressed to make the electrode layer homogeneous and make the electrode density high. However, the inventors' investigation demonstrates that when the pressure for the pressing is raised to make the electrode density high by press working in the case where any one of the above-mentioned conventional binders is used, a tendency that the aluminum foil of the current collector is damaged or increase in the internal resistance of the electrode is observed. Thus, it is difficult to obtain an electrode layer having a density raised to a desired level.

Thus, an object of the present invention is to provide a binder for an electric double layer capacitor electrode which gives an electrode having a high electrode density and a high binding force, and a binder composition for an electric double layer capacitor electrode and a slurry composition for an electric double layer capacitor electrode each of which comprise the binder. Another object of the invention is to provide an electrode produced by use of the slurry composition, and an electric double layer capacitor having the electrode.

Means for Solving the Problems

The inventors have made eager investigations for solving the problems, so as to find out that in the case of using, as a binder, a polymer that can give a polymer film which has a small tensile stress and further exhibits a large elongation when the film is cut, an electrode having a high binding force and a high electrode density can be obtained. On the basis of this finding, the invention has been made.

Thus, the following (1) to (6) are provided according to the invention.

(1) A binder for an electric double layer capacitor electrode, comprising a polymer which can give a polymer film having a tensile stress of 2 MPa or less when the film is elongated at the ratio of 100% and having the elongation at break of 450% or more.

The polymer is preferably a polymer comprising a monomeric unit obtained by polymerizing a compound represented by the following general formula (1) in a total amount of 60% or more by weight:

$$CH_2=CR^1-COOR^2 \qquad (1)$$

(wherein $R^1$ represents a hydrogen atom or a methyl group, and $R^2$ represents an alkyl group or a cycloalkyl group).

The polymer is preferably a polymer having a crosslinkable functional group.

The crosslinkable functional group is preferably an N-methylolamide group.

The crosslinkable functional group is preferably the combination of a sulfonic acid group or a salt thereof and an epoxy group.

(2) A binder composition for an electric double layer capacitor electrode, wherein the binder as described in the item (1) is dispersed in water.

(3) A slurry composition for an electric double layer capacitor electrode, comprising the binder composition as described in the item (2) and an active material for an electrode.

(4) An electrode for an electric double layer capacitor, wherein an electrode layer comprising the binder as described in the item (1) and an active material for an electrode are bound to a current collector.

(5) A method for producing an electrode for an electric double layer capacitor, comprising the steps of: applying the electrode slurry composition as described in the item (3) to a current collector, and then drying the composition.

It is preferred that the production method further comprises the step of pressing the composition after drying thereof.

It is preferred that the production method further comprises the step of heat-treatment for the composition at 150 to 250° C.

(6) An electric double layer capacitor comprising the electrode as described in the item (4).

ADVANTAGEOUS EFFECTS OF THE INVENTION

When the binder of the invention is used to produce an electrode, the resultant electrode has a large electrode density and a strong binding force. When this electrode is used, an electric double layer capacitor having a large electrostatic capacity and a small internal resistance can be obtained.

BEST MODE FOR CARRYING OUT THE INVENTION

(1) Binder for an Electric Double Layer Capacitor Electrode

The binder for an electric double layer capacitor electrode (hereinafter, referred to merely as the "binder" in some cases) of the invention comprises a polymer which can give a polymer film having a tensile stress of 2 MPa or less when the film is elongated at a ratio of 100% and having an elongation of 450% or more when the film is cut. In this case, the polymer film is a film produced by a dispersion of the polymer in water on the basis of the method described in ISO 498. A value of the tensile stress and the elongation when the film is cut are respectively measured by the method of JIS K6251 using a dumbbell-shaped number four-type test piece made from the polymer film.

When the film is elongated at a ratio of 100%, the tensile stress is preferably 1.5 MPa or less, more preferably from 0.1 to 1 MPa. When the film is cut, the elongation is preferably 500% or more, more preferably from 600 to 2,000%. In the case where the tensile stress when the film is elongated at a ratio of 100% and the elongation when the film is cut are within these ranges, the binding force is high and further the electrode density can be more easily made high by pressing the film lightly.

As such a polymer, specifically an elastomer can be used. The elastomer is a polymer having a glass transition temperature thereof in a normal temperature (25° C.) or lower, preferably −10° C. or lower, more preferably −20° C. or lower. When the glass transition temperature is within this range, the binding force is particularly excellent.

The elastomer is preferably a diene-based elastomer made mainly of a monomeric unit obtained by polymerizing a conjugated diene such as butadiene or isoprene, or a monomeric unit obtained by hydrogenating the above-mentioned monomeric unit; an acrylate-based elastomer made mainly of a monomeric unit obtained by polymerizing an acrylic acid ester and/or a methacrylic acid ester; or the like. The acrylate-based elastomer is more preferred since the internal resistance of the electrode to be obtained can be made small. The wording "made mainly of a monomeric unit" means that the monomeric unit is contained in an amount of 40% or more by weight.

Examples of the diene-based elastomer include polybutadiene, polyisoprene, styrene/butadiene copolymer which may be carboxy-modified, acrylonitrile/butadiene copolymer, and hydrogenated products thereof.

The acrylate-based elastomer is preferably a polymer comprising a monomeric unit obtained by polymerizing a compound represented by the following general formula (1): $CH_2=CR^1-COOR^2$ [wherein $R^1$ represents a hydrogen atom or a methyl group, and $R^2$ represents an alkyl group or a cycloalkyl group] in a total amount of 60% or more by weight, preferably in a total amount of 80% or more by weight. The acrylate-based elastomer can be obtained by copolymerizing the compound represented by the general formula (1) with a monomer copolymerizable therewith.

Specific examples of the compound represented by the general formula (1) include alkyl acrylates such as ethyl acrylate, propyl acrylate, isopropyl acrylate, n-butyl acrylate, isobutyl acrylate, t-butyl acrylate, n-pentyl acrylate, isopentyl acrylate, n-hexyl acrylate, 2-ethylhexyl acrylate, nonyl acrylate, lauryl acrylate, and stearyl acrylate; cycloalkyl acrylates such as isobornyl acrylate; alkyl methacrylates such as ethyl methacrylate, propyl methacrylate, isopropyl methacrylate, n-butyl methacrylate, isobutyl methacrylate, t-butyl methacrylate, n-pentyl methacrylate, isopentyl methacrylate, n-hexyl methacrylate, 2-ethylhexyl methacrylate, octyl methacrylate, isodecyl methacrylate, lauryl methacrylate, tridecyl methacrylate, and stearyl methacrylate; and cycloalkyl methacrylates such as cyclohexyl methacrylate. Among these, n-butyl acrylate and 2-ethylhexyl acrylate are particularly preferred.

Examples of the monomer copolymerizable with the compound represented by the general formula (1) include aromatic vinyl compounds such as styrene, α-methylstyrene, 2-methylstyrene, 3-methylstyrene, and 4-methylstyrene; α,β-unsaturated nitrile compounds such as acrylonitrile, and methacrylonitrile; 1-olefins such as ethylene, propylene, and 1-butene; crotonic acid esters such as methyl crotonate, ethyl crotonate, propyl crotonate, butyl crotonate, isobutyl crotonate, n-pentyl crotonate, isopentyl crotonate, n-hexyl crotonate, and 2-ethylhexyl crotonate; maleic acid diesters such as dimethyl maleate, dibutyl maleate, and di-2-ethylhexyl maleate; fumaric acid diesters such as dimethyl fumarate, and dibutyl fumarate; itaconic acid diesters such as dimethyl itaconate, and dibutyl itaconate; and acrylamides such as acrylamide, and methacrylamide. Other examples thereof include monomers having a crosslinkable functional group, which will be described later.

The process for producing the polymer which is the binder of the invention is not particularly limited, and the polymer can be obtained by polymerizing each of the above-mentioned monomers by a known polymerizing method such as emulsion polymerization, suspension polymerization, dispersion polymerization or solution polymerization. Among these, it is particularly preferred to produce the polymer by emulsion polymerization since the particle diameter of the binder is easily controlled.

In order for the polymer used in the invention to have a tensile stress and an elongation when it is cut within the above-mentioned ranges, it is preferred that the amount of a crosslinked structure therein is small. When a polymer having a small amount of a crosslinked structure is used, the electrode density can easily be made high by light pressing.

The content by percentage of the crosslinked structure can be adjusted in accordance with the polymerization temperature and time, and the amount of a used polyfunctional monomer and a used chain transfer agent when the polymer is produced, and others. At the time of producing, for example, a diene-based elastomer, the polymerization temperature is preferably from 5 to 90° C., and the polymerization time is preferably from 2 to 100 hours. As the chain transfer agent, the following can be used: a mercaptan compound such as n-octylmercaptan, n-dodecylmercaptan, or t-dodecylmercaptan; a halogenated hydrocarbon such as carbon tetrachloride, or carbon tetrabromide. The chain transfer agent can be added before the start of the polymerization or in the midstream of the polymerization. The amount of the used chain transfer agent is usually from 0.01 to 5 parts by weight for 100 parts by weight of the monomer(s). When the chain transfer agent is a mercaptan compound, the amount thereof is preferably from 0.01 to 2 parts by weight for 100 parts by weight of the monomer(s). When the chain transfer agent is a halogenated hydrocarbon, the amount thereof is preferably from 2 to 5 parts by weight for 100 parts by weight of the monomer(s), and it is preferred that 0.01 to 1 part by weight of a mercaptan compound is further used therewith.

When the acrylate-based elastomer is produced, the amount of a used polyfunctional monomer such as ethylene glycol dimethacrylate or trimethylolpropane trimethacrylate is preferably 1% or less by weight in the whole amount of the monomer(s).

The polymer used in the invention preferably has a crosslinkable functional group in the molecule thereof. The crosslinkable functional group is a functional group capable of forming a crosslinked structure by receiving heat, irradiation with active radiation rays or the like after forming electrode layer. The group is preferably a thermally crosslinkable functional group, which is capable of forming a crosslinked structure by receiving heat.

The thermally crosslinkable functional group is, for example, an N-methylolamide group. The group may be a combination which is made of two or more functional groups and is capable of forming a crosslinked structure, such as a combination of an epoxy group and a carboxyl group, acid anhydride group, hydroxyl group or sulfonic acid group, or a salt thereof, or a combination of a carboxyl group and an ethyleneimine group. Examples of the functional group capable of forming a crosslinked structure by receiving irradiation with active radiation rays include acryloyl, methacryloyl, and allyl groups.

The polymer having in the molecule thereof a crosslinkable functional group is obtained by copolymerizing a monomer having the crosslinkable functional group in the production of the polymer. Examples of a monomer having the thermally crosslinkable functional group include N-methylolacrylamide, and N-methylolmethacrylamide.

Examples of a monomer having a functional group which is made of the above-mentioned combination of two or more functional groups and is capable of forming a crosslinked structure include: unsaturated monocarboxylic acids such as acrylic acid, methacrylic acid, crotonic acid, and isocrotonic acid; unsaturated dicarboxylic acids such as maleic acid, fumaric acid, citraconic acid, mesaconic acid, glutaconic acid, and itaconic acid; unsaturated dicarboxylic acid anhydrides such as maleic anhydride, citraconic anhydride, and itaconic anhydride; unsaturated carboxylic acid esters having a hydroxyl group such as hydroxyethyl acrylate, hydroxypropyl acrylate, hydroxybutyl acrylate, hydroxyethyl methacrylate, hydroxypropyl methacrylate, hydroxypropyl crotonate; unsaturated organic sulfonic acids such as vinylsulfonic acid, methylvinylsulfonic acid, allylsulfonic acid, methallylsulfonic acid, styrenesulfonic acid, acrylic acid-2-ethyl sulfonate, methacrylic acid-2-ethyl sulfonate, 2-acrylamide-2-methylpropanesulfonic acid and 3-allyloxy-2-hydroxypropanesulfonic acid, and alkali metal salts and ammonium salts thereof; unsaturated carboxylic acid esters having an epoxy group, such as glycidyl acrylate, and glycidyl methacrylate; unsaturated ethers having an epoxy group, such as allyl glycidyl ether. The total amount of the monomer(s) having a crosslinkable functional group is preferably from 0.1 to 10% by weight in the whole of the monomer(s).

(2) Binder Composition for an Electric Double Layer Capacitor Electrode

The binder composition for an electric double layer capacitor electrode (hereinafter, referred to merely as the "binder composition" in some cases) of the invention is a composition wherein the above-mentioned binder is dispersed in water. The method for dispersing the binder into water is not particularly limited. For example, it is advisable to incorporate/disperse the binder which is made into fine particles by spray drying or comminution into water in accordance with an ordinary method. When the binder is obtained as an aqueous dispersion by emulsion polymerization, the concentration thereof is adjusted by concentration, dilution or the like as needs arise, and then the binder can be used as it is, without being isolated, as the binder composition of the invention. The concentration of the binder composition (the solid content) is usually from 20 to 70% by weight.

(3) Slurry Composition for an Electric Double Layer Capacitor Electrode

The slurry composition for an electric double layer capacitor electrode (hereinafter, referred to merely as the "slurry composition" in some cases) of the invention comprises the binder composition of the invention and an active material for an electrode, and further comprises a thickener, an electro-conductivity additive, and so on, as needs arise.

The active material for an electrode used in the invention is an allotrope of carbon having fine pores capable of forming an electric double layer. The specific surface area thereof is 30 $m^2/g$ or more, preferably from 500 to 5,000 $m^2/g$ or more, more preferably from 1,000 to 3,000 $m^2/g$ or more. Specifically, powder or fiber made of activated carbon, polyacene, carbon whisker, graphite or the like can be used. The active material for an electrode is preferably activated carbon. As the activated carbon, a phenol type, rayon type, acrylic type, pitch type or coconut husk type, or some other type can be used. As the active material for an electrode, there can also be used non-porous carbon which is described in JP-A Nos. 11-317333, 2002-25867 and so on and has microcrystalline carbon similar to graphite, the interlayer distance of the microcrystalline carbon being enlarged. In the case where the particle diameter of the active material for an electrode is from 0.1 to 100 μm, more preferably from 1 to 20 μm, the electrode for a capacitor is easily made thin and the capacity density can also be made high. Thus, the case is preferred.

The amount of the binder in the slurry composition of the invention is preferably from 0.1 to 20 parts by weight, more preferably from 0.5 to 10 parts by weight for 100 parts by weight of the active material for an electrode. If the binder amount is too small, the active material for an electrode or the electroconductivity additive falls off easily from the electrode. Conversely, if the amount is too large, the active material for an electrode may be covered up with the binder may raise the increase of the internal resistance of the electrode.

The slurry composition of the invention preferably contains a thickener. The addition of the thickener causes an improvement in the paintability or fluidity of the slurry composition. The kind of the thickener is not particularly limited, but a water-soluble polymer is preferable. Specific examples of the water-soluble polymer include cellulose-based polymers such as carboxymethylcellulose, methylcellulose, and hydroxypropylcellulose, and ammonium salts and alkali metal salts thereof; polyacrylic (or methacrylic) acid salts such as sodium polyacrylate (or methacrylate), polyvinyl alcohol, polyethylene oxide, polyvinyl pyrrolidone, copolymer made from acrylic acid or an acrylic acid salt and vinyl alcohol, copolymer made from maleic anhydride, maleic acid or fumaric acid and vinyl alcohol, modified polyvinyl alcohol, modified polyacrylic acid, polyethylene glycol, polycarboxylic acid, oxidized starch, starch phosphate, casein, and various modified starches. Among these, cellulose-based polymers and salts thereof are preferably used. More preferred are ammonium salts of cellulose-based polymers. The used amount of the water-soluble polymer is preferably from 0.5 to 5 parts by weight for the active material for an electrode.

The slurry composition of the invention may contain any other binder as long as the objects of the invention are not undermined. Specific examples thereof include a homopolymer of an α,β-unsaturated nitrile compound such as acrylonitrile or methacrylonitrile; a copolymer resin made from an α,β-unsaturated nitrile compound and a monomer copolymerizable therewith; and fluorocarbon polymers such as polyvinylidene fluoride, polytetrafluoroethylene, and polypentafluoropropylene. The content of the binder is preferably 50% or less by weight of the binder of the invention, preferably 20% or less by weight thereof.

The slurry composition of the invention preferably contains an electroconductivity additive. As the electroconductivity additive, an electroconductive carbon can be used, examples thereof include acetylene black, KETJENBLACK, and carbon black. This agent is mixed with the above-described active material for an electrode and the mixture is used. The use of the electroconductivity additive causes a further improvement in electrical contact between particles of the active material to reduce the internal resistance of the electric double layer capacitor and further to make the capacity density high. The used amount of the electroconductivity additive is usually from 0.1 to 20 parts by weight, preferably from 2 to 10 parts by weight for 100 parts by weight of the active material for an electrode.

In the case of using, as the binder, the polymer having a crosslinkable functional group capable of forming a structure by irradiation with active radiation rays, an optically crosslinking agent may be added as needs arise. Examples of the optically crosslinking agent include benzyl dimethyl ketal, trimethylsilylbenzophenone, benzoin, 4-methoxybenzophenone, and benzoin methyl ether anthraquinone.

The slurry composition of the invention can be produced by mixing the binder composition of the invention, the active material for an electrode, and each of the above-mentioned other components that are added as needs arise by use of a mixer. The mixer that can be used is a ball mill, a sand mill, a pigment disperser, a crusher, an ultrasonic wave disperser, a homogenizer, a planetary mixer, a Hobart mixer, or the like. Preferred is also a method of mixing the active material for an electrode firstly with the electroconductivity additive by use of a mixer such as a crusher, a planetary mixer, a Henschel mixer, an Omni mixer, nextly adding the binder composition thereto, and mixing the resultant homogeneously. The adoption of this method makes it possible to yield a homogeneous slurry composition easily.

(4) Electrode for an Electric Double Layer Capacitor

The electrode for an electric double layer capacitor hereinafter, (referred to merely as the "electrode" in some cases) of the invention is a product wherein an electrode layer comprising the binder of the invention and an active material for an electrode is bound to a current collector. The current collector is not particularly limited if it is a material having electroconductive and electrochemical endurance. Preferred is a metallic material such as aluminum, titanium, tantalum, stainless steel, gold, or platinum since the material has heat resistance. Aluminum and platinum are particularly preferred. The shape of the current collector is not particularly limited. Usually, a product in the form of a sheet having a thickness of about 0.001 to 0.5 mm is used.

The electrode of the invention can be produced by applying the slurry of the invention to the current collector and then drying the composition. The method for applying the slurry composition to the current collector is not particularly limited, and examples thereof include doctor blade, dipping, reverse roll, direct roll, gravure, extrusion, and brush painting methods. The viscosity of the slurry composition is varied in accordance with the kind of the applicator or the shape of applicating lines to be painted, and is usually from 100 to 100,000 mPa·s, preferably from 1,000 to 50,000 mPa·s, more preferably from 5,000 to 20,000. The amount of the slurry composition to be applied is not particularly limited, and is generally an amount making the thickness of the electrode layer, which is composed of the active material for an electrode, the binder and so on and is formed by the drying, usually into 0.005 to 5 mm, preferably into 0.01 to 2 mm. The method for the drying may be, for example, drying with warm wind, hot wind or low humidity wind, vacuum drying, or drying by irradiation with (far-)infrared rays, electron beams or the like. The temperature for the drying is usually from 50 to 250° C.

The electrode after the drying is preferably pressed. About the electrode of the invention, the electrode density thereof can be made high by the pressing. Examples of the method for the pressing include mold pressing, and roll pressing. The pressing temperature is not particularly limited, and may be usually a room temperature.

The electrode after the pressing is preferably heated at 150 to 250° C. When the electrode is heated after the pressing, water content in the electrode can be completely removed. In the case of using, as the binder, the polymer having in the molecule thereof a thermally crosslinkable functional group, the polymer forms a crosslinked structure by the heat-treatment so that the strength of the electrode can be improved. Thus, the case is preferred. The time for the heat-treatment is usually from 10 minutes to 20 hours.

Furthermore, in the case of using, as the binder, the polymer having a crosslinkable functional group capable of forming a structure by active radiation rays, a crosslinked structure may be formed by irradiation with the active radiation rays such as ultraviolet rays or an electron beam.

(5) Electric Double Layer Capacitor

The electric double layer capacitor of the invention is a product having the electrode of the invention. The electric double layer capacitor can be produced by using the electrode, an electrolytic solution, and members such as a separator in an ordinary method. Specifically, for example, the capacitor can be produced by stacking a plurality of the electrodes to interpose a separator therebetween, winding or folding this in accordance with the capacitor shape, putting the resultant into a container, injecting an electrolytic solution into the container, and then sealing up the container.

As the separator, a known separator can be used, examples thereof including a finely porous membrane or nonwoven cloth made of a polyolefin such as polyethylene or polypropylene; a porous membrane made mainly of pulp, which is generally called electrolytic condenser paper; and a porous resin which contains inorganic ceramic powder. Instead of the separator, a solid electrolyte or a gel electrolyte may be used.

The electrolytic solution is not particularly limited, and is preferably a non-aqueous electrolytic solution wherein an electrolyte is dissolved in an organic solvent. The electrolyte that can be used may be any electrolyte known in the prior art. Examples thereof include tetraethylammonium tetrafluoroborate, triethylmonomethylammonium tetrafluoroborate, and tetraethylammonium hexafluorophosphate.

The solvent in which these electrolytes are dissolved (electrolytic solution solvent) is not particularly limited if the solvent is a solvent that is generally used as an electrolytic solution solvent. Specific examples thereof include carbonates such as propylene carbonate, ethylene carbonate, and butylene carbonate; lactones such as γ-butyrolactone; sulfolanes; and nitriles such as acetonitrile. These may be used alone or in the form of a mixed solvent of two or more thereof. Among these, carbonates are preferred since they have a high withstanding voltage. The concentration of the electrolytic solution is usually 0.5 mol/L or more, preferably 0.8 mol/L or more.

EXAMPLES

The invention will be described by way of the following examples. However, the invention is not limited thereto. Unless otherwise specified, a part or parts and % in the examples are those by weight.

Tests and evaluations in working examples and comparative examples were made by the following methods.

(1) Glass Transition Temperature (Tg)

The glass transition temperature of a polymer used as a binder was measured by using a differential scanning calorimeter (DSC) while the temperature was raised at 5° C. per minute.

(2) Tensile stress when a polymer film was elongated at a ratio of 100%, and elongation when the film was cut A polymer film was formed from a binder composition on the basis of a method described in ISO 498. From this polymer film, a dumbbell-shaped number four-type test piece was formed. According to JIS K6251, the tensile stress was measured when the film was elongated at a ratio of 100%, and the elongation was measured when the film was cut.

(3) Electrode Density

An electrode was cut into a 5 cm×5 cm size. The weight and the thickness thereof were measured. Therefrom, the weight and the thickness of its current collector, respectively, were subtracted. The density (g/cm$^3$) of the electrode layer was then calculated.

(4) Peel Strength of an Electrode

An electrode was cut into a rectangle 100 mm long and 25 mm wide in the state that the applying direction was made parallel to its long side. This was used as a test piece. The piece was fixed to direct its electrode layer face upwards. A cellophane tape was made to adhere onto the electrode layer face of the test piece, and then one end of the cellophane tape was vertically pulled and peeled at a tensile speed of 50 mm/minute. The stress at this time was measured. This measurement was repeated 3 times. The average value thereof was obtained, and this was defined as the peel strength. As the peel strength is larger, the binding force of the electrode layer to the current collector is larger.

(5) Electrostatic Capacity and Internal Resistance of an Electric Double Layer Capacitor At 25° C., an electric double layer capacitor was charged up to 2.7 V at a constant current of 10 mA for 10 minutes. Thereafter, the capacitor was discharged to 0 V at a constant current of 1 mA. From the resultant charge/discharge curve, the electrostatic capacity was obtained. The resultant value was divided by the weight of the electrode layer, which was obtained by subtracting the weight of the current collector from that of the electrode, so as to give the electrostatic capacity per unit weight of the electrode layer. The internal resistance was calculated out from the charge/discharge curve in accordance with a calculating method in standard RC-2377 prescribed by Japan Electronics and Information Technology Industries Association (JEITA).

Example 1

A reactor equipped with a stirrer was purged with nitrogen, and thereto were supplied 38 parts of acrylonitrile, 59.5 parts of 1,3-butadiene, 2.5 parts of methacrylic acid, 0.4 part of t-dodecylmercaptan (TDM) as a chain transfer agent, 0.1 part of 1,1,3,3-tetramethylbutylhydroperoxide and 0.008 part of ferrous sulfate as polymerization initiators, 120 parts of soft water, and 6 parts of an emulsion (Walorate [transliteration] u, manufactured by TOSHIN KAGAKU Co., Ltd.). The resultant was stirred at 5° C. for 40 hours to conduct polymerization. The polymerization conversion ratio was 95%. The composition ratio of the resultant polymer was consistent with the provided ratio of the monomers. The Tg of the resultant polymer is shown in Table 1. Next, thereto was added potassium hydroxide to adjust the pH to 7. Thereafter, steam was introduced thereinto, so as to remove the unreacted monomers. Next, the resultant was concentrated to set the solid concentration to 40% so as to yield a binder composition A as a dispersion of an acrylonitrile/butadiene-based elastomer in water. This binder composition A was used to yield a polymer film. The tensile stress when the film was elongated at a ratio of 100%, and the elongation when the film was cut are shown in Table 1.

Next, a planetary mixer was used to mix 50 parts of acetylene black (powdery Denka Black, manufactured by Denki Kagaku Kogyo Kabushiki Kaisha) as an electroconductivity additive, 200 parts of a 5% carboxymethylcellulose solution in water (Cellogen 7A, manufactured by Dai-ichi Kogyo Seiyaku Co., Ltd.) as a dispersing agent, and 50 parts of water so as to disperse the electroconductivity additive, thereby yielding a dispersion of the electroconductivity additive, the solid concentration therein being 20%. An appropriate amount of water was added to 30 parts of the resultant dispersion, 100 parts of high-purity activated carbon powder having an average particle diameter of 5 μm and a specific surface area of 2000 m$^2$/g as an active material for an electrode, and 7.5 parts of the binder composition A, and then the resultant was mixed in a planetary mixer with appropriate amount of water to yield a slurry composition.

A doctor blade was used to apply the resultant slurry composition to an aluminum foil having a thickness of 20 μm, and the resultant was dried at 60° C. for 20 minutes and at 120° C. for 20 minutes, and subjected to roll pressing, thereby yielding an electrode having a thickness of 120 μm. The resultant electrode was heated at 150° C. under a reduced pressure for 6 hours. The electrode density and the peel strength of the resultant electrode are shown in Table 1.

The electrode yielded as described above was cut into circles having a diameter of 12 mm. Electrode layer faces of these two electrodes were made opposite to each other, and a separator made of a rayon-based porous circular film of 16 mm in diameter and of 35 μm in thickness was sandwiched therebetween. This was put together with a spacer made of stainless steel into a coin-shaped outside container made of stainless steel (diameter: 20 mm, height: 1.8 mm, and thickness of the stainless steel: 0.25 mm). An electrolytic solution was incorporated thereinto without leaving air. Thereafter, the container was sealed up to produce an electric double layer capacitor. The used electrolytic solution was a solution wherein triethylmonomethylammonium tetrafluoroborate was dissolved in propylene carbonate at a concentration of 1.8 mol/L. The storage of the electrode after the heat-treatment and the fabrication of the capacitor were performed in a dry room having a dew-point temperature of −60° C. The electrostatic capacity and the internal resistance of the resultant electric double layer capacitor are shown in Table 1.

le;.5qExample 2 le;.5qInto a reactor equipped with a stirrer were supplied with 70 parts of ion exchange water, 0.2 part of sodium dodecylbenzenesulfonate, and 0.3 part of potassium peroxodisulfate, and then a gas part therein was purged with nitrogen gas. The temperature of the system was raised to 80° C. In another container, 50 parts of ion exchange water, 0.5 part of sodium dodecylbenzenesulfonate, 85 parts of 2-ethylhexyl acrylate, 12 parts of styrene, and 3 parts of methacrylic acid were mixed to yield a monomer mixture. This monomer mixture was continuously added to the above-mentioned reactor over 5 hours to conduct polymerization. During the addition, the reaction was conducted at 80° C. After the end of the addition, the inside of the system was stirred at 85° C. for 3 hours, and then the reaction was ended. The polymerization conversion ratio was 98.3%. The composition ratio of the resultant polymer was consistent with the provided ratio of the monomers. The Tg of the resultant polymer is shown in Table 1. The reaction solution was cooled to 25° C. and then thereto was added with potassium hydroxide to adjust the pH to 7. Thereafter, steam was introduced thereinto, so as to remove the monomers unreacted. Next, the resultant was concentrated to set the solid concentration to 40% so as to yield a binder composition B as a dispersion of an acrylate-based elastomer in water. This binder composition B was used to yield a polymer film. The tensile stress when the film was elongated at a ratio of 100%, and the elongation when the film was cut were measured. This binder composition B was used to produce a slurry composition, electrodes, and an electric double layer capacitor and measure each of the properties about these products in the same way as in Example 1. The results are shown in Table 1.

le;.5qExample 3 le;.5qA binder composition C was yielded in the same way as in Example 2 except that the amount of 2-ethylhexyl acrylate in the monomer mixture was 83 parts and 2 parts of N-methylolacrylamide were used. The polymerization conversion ratio was 98.5%. The composition ratio of the resultant polymer was consistent with the provided ratio of the monomers. The Tg of the resultant polymer is shown in Table 1. A polymer film obtained by use of this binder composition C and the binder composition C were used to produce a slurry composition, electrodes, and an electric double layer capacitor in the same way as in Example 1. About these, each of the properties was measured. The results are shown in Table 1.

le;.5qExample 4 le;.5qInto a reactor equipped with a stirrer were supplied 70 parts of ion exchange water, 0.2 part of sodium dodecylbenzenesulfonate, and 0.3 part of potassium peroxodisulfate, and then a gas part therein was purged with nitrogen gas. The temperature of the system was raised to 60° C. In another container, 50 parts of ion exchange water, 0.5 part of sodium dodecylbenzenesulfonate, 88.5 parts of butyl acrylate, 10 parts of acrylonitrile, 1 part of glycidyl methacrylate, and 0.5 part of 2-acrylamide-2-methylpropanesulfonic acid were mixed to yield a monomer mixture. This monomer mixture was continuously added to the above-mentioned reactor over 4 hours to conduct polymerization. During the addition, the reaction was conducted at 60° C. After the end of the addition, the inside of the system was stirred at 70° C. for 3 hours, and then the reaction was ended. The polymerization conversion ratio was 98.5%. The composition ratio of the resultant polymer was consistent with the provided ratio of the monomers. The Tg of the resultant polymer is shown in Table 1. The reaction solution was cooled to 25° C. and then thereto was added ammonia water to adjust the pH to 8. Thereafter, steam was introduced thereinto, so as to remove the monomers unreacted. Next, the resultant was concentrated to set the solid concentration to 40% so as to yield a binder composition D as a dispersion of an acrylate-based elastomer in water. This binder composition D was used to yield a polymer film. The tensile stress when the film was elongated at a ratio of 100%, and the elongation when the film was cut were measured. This binder composition D was used to produce a slurry composition, electrodes, and an electric double layer capacitor and measure each of the properties about these products in the same way as in Example 1. The results are shown in Table 1.

le;.5qComparative Example 1 le;.5qA binder composition E was yielded in the same way as in Example 1 except that TDM was not used. The polymerization conversion ratio was 98.5%. The composition ratio of the resultant polymer was consistent with the provided ratio of the monomers. The Tg of the resultant polymer is shown in Table 1. A polymer film obtained by use of this binder composition E and the binder composition E were used to produce a slurry composition, electrodes, and an electric double layer capacitor in the same way as in Example 1. About these, each of the properties was measured. The results are shown in Table 1.

le;.5qComparative Example 2 le;.5qA binder composition F was yielded in the same way as in Example 2 except that the amount of styrene in the monomer mixture was 9 parts, and 3 parts of diethylene glycol dimethacrylate were used. The polymerization conversion ratio was 98.9%. The composition ratio of the resultant polymer was consistent with the provided ratio of the monomers. The Tg of the resultant polymer is shown in Table 1. A polymer film obtained by use of this binder composition F and the binder composition F were used to produce a slurry composition, electrodes, and an electric double layer capacitor in the same way as in Example 1. About these, each of the properties was measured. The results are shown in Table 1.

le;.5qComparative Example 3 le;.5qA binder composition G was yielded in the same way as in Example 2 except that a mixture was used which was composed of 50 parts of ion exchange water, 0.5 part of sodium dodecylbenzenesulfonate, 47 parts of styrene, 39 parts of butadiene, 10 parts of methyl methacrylate, and 4 parts of itaconic acid as a monomer mixture, and the time when the monomer mixture was added was set to 15 hours, and the time for the reaction after the end of the addition was set to 5 hours. The polymerization conversion ratio was 98.3%. The composition ratio of the resultant polymer was consistent with the provided ratio of the monomers. The Tg of the resultant polymer is shown in Table 1. A polymer film obtained by use of this binder composition G and the binder composition G were used to produce a slurry composition, electrodes, and an electric double layer capacitor in the same way as in Example 1. About these, each of the properties was measured. The results are shown in Table 1.

TABLE 1

| | Example 1 | Example 2 | Example 3 | Example 4 | Comparative Example 1 | Comparative Example 2 | Comparative Example 3 |
|---|---|---|---|---|---|---|---|
| Tg (° C.) | −35 | −53 | −50 | −43 | −35 | −53 | −10 |
| Tensile stress (MPa) at the time of the 100% elongation | 1.5 | 0.8 | 0.8 | 0.8 | 3.0 | 2.5 | 2.1 |
| Elongation (%) at the time of the cutting | >1000% | 550 | 700 | 700 | 300 | 300 | 400 |
| Electrode density (g/cm$^3$) | 0.632 | 0.634 | 0.641 | 0.640 | 0.583 | 0.600 | 0.596 |
| Peel strength (N/cm) | 0.059 | 0.078 | 0.098 | 0.100 | 0.049 | 0.039 | 0.039 |
| Electrostatic capacity (F/g) | 60.1 | 60.7 | 58.8 | 61.0 | 54.6 | 56.2 | 55.6 |
| Internal resistance (ΩF) | 3.60 | 3.30 | 3.32 | 3.12 | 3.72 | 3.32 | 3.73 |

As shown in Table 1, it is understood that electrodes produced by use of any binder of the invention have a large electrode density and a strong binding force. When the electrodes are used, an electric double layer capacitor having a large electrostatic capacity and a small internal resistance can be obtained.

The invention claimed is:

1. A binder for an electric double layer capacitor electrode, comprising a polymer:
    wherein the polymer comprises a monomeric unit obtained by polymerizing a compound represented by the following formula (1) in a total amount of 60% or more by weight:

$$CH_2 = CR^1 - COOR^2 \quad (1)$$

in which $R^1$ represents a hydrogen atom or a methyl group and $R^2$ represents an alkyl group or a cycloalkyl group;
    wherein the polymer has a crosslinkable functional group which is a combination of an epoxy group and a sulfonic acid group or a salt thereof; and
    wherein the total amount of the monomer having the crosslinkable functional group is from 0.1 to 10% by weight in the whole of the monomers,
    whereby said polymer can give a polymer film having a tensile stress of 2 MPa or less when the film is elongated at the ratio of 100% and having the elongation at break of 450% or more.

2. A binder composition for an electric double layer capacitor electrode, wherein the binder as claimed in claim 1 is dispersed in water.

3. A slurry composition for an electric double layer capacitor electrode, comprising the binder composition as claimed in claim 2 and an active material for an electrode.

4. An electrode for an electric double layer capacitor, wherein an electrode layer comprising the binder as claimed in claim 1 and an active material for an electrode are bound to a current collector.

5. A method for producing an electrode for an electric double layer capacitor, comprising the steps of:
    applying the electrode slurry composition as claimed in claim 3 to a current collector, and then drying the composition.

6. The method for producing an electrode for an electric double layer capacitor according to claim 5, further comprising the step of pressing the composition after drying thereof.

7. The method for producing an electrode for an electric double layer capacitor according to claim 6, further comprising the step of heating the composition at 150 to 250° C.

8. An electric double layer capacitor, comprising the electrode as claimed in claim 4.

* * * * *